(12) United States Patent
Okamura et al.

(10) Patent No.: US 6,852,524 B2
(45) Date of Patent: Feb. 8, 2005

(54) PROBE CARRIER, PROBE FIXING CARRIER AND METHOD OF MANUFACTURING THE SAME

(75) Inventors: Nobuyuki Okamura, Kanagawa (JP); Tadashi Okamoto, Kanagawa (JP); Makoto Kameyama, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 213 days.

(21) Appl. No.: 10/133,675

(22) Filed: Apr. 29, 2002

(65) Prior Publication Data

US 2002/0192600 A1 Dec. 19, 2002

(30) Foreign Application Priority Data

Apr. 27, 2001 (JP) ........................... 2001-133697
Apr. 27, 2001 (JP) ........................... 2001-133698

(51) Int. Cl.⁷ ............................................. G01N 21/00
(52) U.S. Cl. .................... 435/287.1; 430/311; 430/322; 385/133
(58) Field of Search ...................... 430/311, 322; 435/287.1–288.7; 385/133; 436/43, 518, 535

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,723,129 A | 2/1988 | Endo et al. | 346/1.1 |
| 4,740,796 A | 4/1988 | Endo et al. | 346/1.1 |
| 5,424,186 A | 6/1995 | Fodor et al. | 435/6 |
| 6,362,004 B1 * | 3/2002 | Noblett | 436/43 |
| 6,426,184 B1 * | 7/2002 | Gao et al. | 435/6 |

FOREIGN PATENT DOCUMENTS

| | | |
|---|---|---|
| EP | 0 703825 | 7/1997 |
| EP | 0 895082 | 2/1999 |
| EP | 0 895083 | 2/1999 |
| JP | 59-123670 | 7/1984 |
| JP | 59-138461 | 8/1984 |
| JP | 11-99000 | 4/1999 |
| JP | 11-187900 | 7/1999 |
| WO | WO 95/35505 | 12/1995 |

* cited by examiner

Primary Examiner—Mark F. Huff
Assistant Examiner—Kripa Sagar
(74) Attorney, Agent, or Firm—Fitzpatrick, Cella, Harper and Scinto

(57) ABSTRACT

A carrier having indexes in a probe non-fixing region is used and solutions containing probes are applied to respective specific positions on the carrier by referring to said indexes and fixed. The position of a target compound that is specifically bonded to a probe fixed to a probe carrier manufactured by a method according to the invention can be accurately and quickly detected by referring to the indexes.

2 Claims, 6 Drawing Sheets

DRY ETCHING TREATMENT

PLASMA TREATMENT

WATER TREATMENT

EVACUATION

EVACUATION

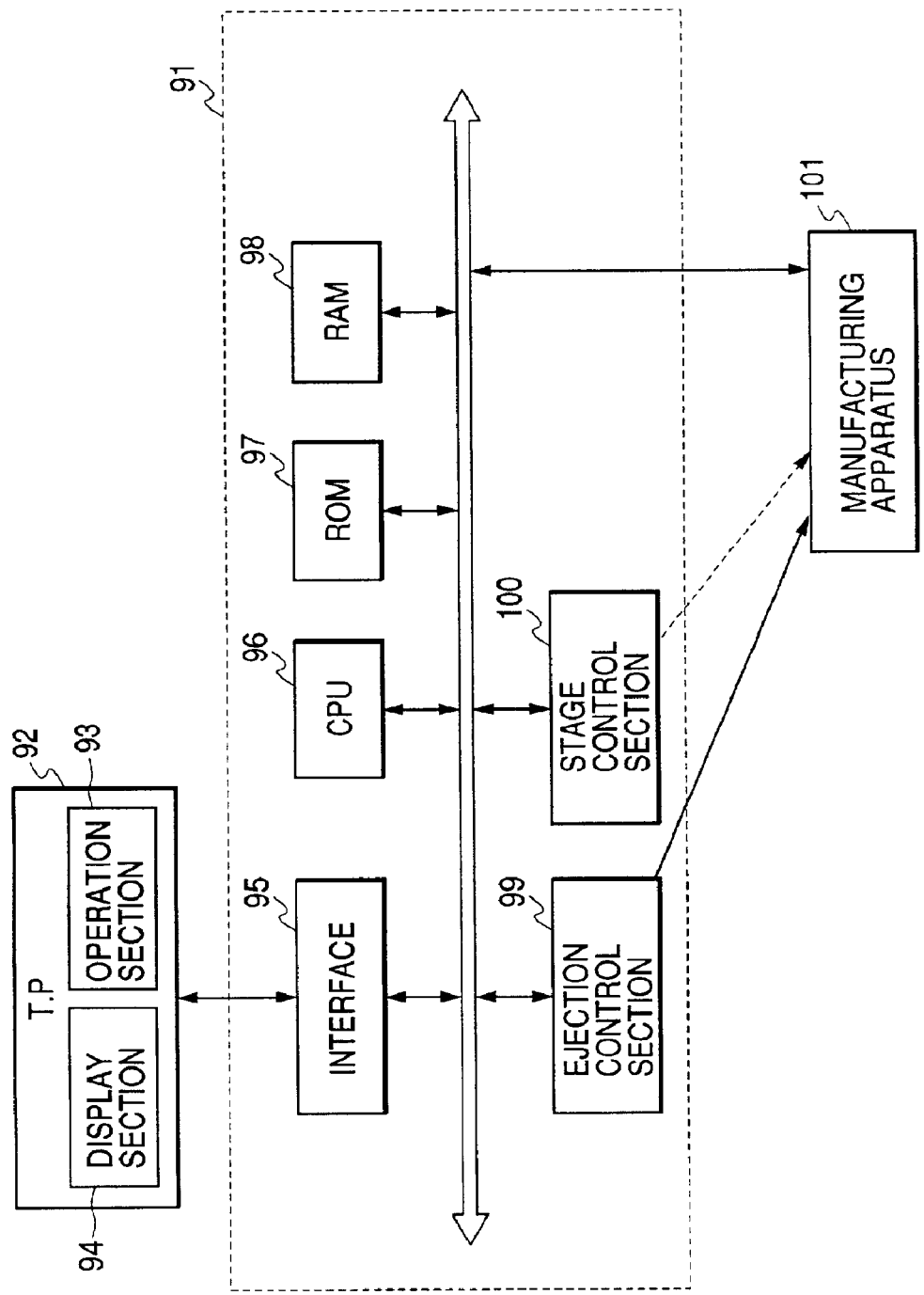

PROBE CARRIER, PROBE FIXING CARRIER AND METHOD OF MANUFACTURING THE SAME

BACKGROUND OF THE INVENTION

1. Field of the Invention

This invention relates to a method of manufacturing a probe carrier by applying a probe solution to a specific position on a carrier, utilizing one or more than one indexes and an ink-jet method in particular. It also relates to a probe carrier manufactured by such a manufacturing method and a method of identifying the position of the target substance bonded to the probe on such a probe carrier by utilizing such indexes.

2. Related Background Art

When analyzing the base sequence of a gene DNA or conducting a gene diagnosis for a number of items simultaneously, probes of different types are needed to single out a DNA having a target base sequence in order to raise the reliability of operation. DNA microchips have been attracting attention as means for providing probes of a number of different types to be used for such sorting operations. A large number of solution specimens (e.g., 96, 384 or 1,536 specimens) containing proteins or drugs to be sorted normally have to be subjected to a screening operation in an orderly manner in the field of high throughput screening of chemicals or combinatorial chemistry. For these purposes, techniques of sequentially arranging a large number of different types of drugs, automatic screening technologies and dedicated devices for sorting the drugs arranged in this way and software for controlling a number of screening operations and statistically processing the obtained results have been and being developed.

Basically, such screening operations as described above that are conducted in parallel simultaneously consist in detecting an action or non-action or a response or non-response of each specimen to the known probes arranged in array, or probe array, provided as means for sorting the substances of specimens for evaluation under same conditions. Generally, the action or response to be used with each probe is defined in advance and therefore substances (drugs) of a same type are normally used as probe species that are mounted on a probe array. Then, the probe array may be that of DNA probes carrying a group of DNAs having different respective base sequences. DNAs, proteins and synthesized chemicals are examples of substances that may be used for a group of probes. While a probe array of a group of a plurality of probe species is used in many instances, a large number of identical DNAs having a same base sequence, identical proteins having a same amino acid sequence or identical chemical substances may be arranged in array depending on the type of screening operation. Such probes are mainly used for screening drugs.

In a probe array formed by a group of a plurality of probe species, a plurality of species of a group of DNAs having different base sequences, a group of proteins having different amino acid sequences, a group of different chemical substances or the like are often arranged in array on a substrate according to a predetermined order of arrangement. Particularly, DNA probe arrays are used for analyzing the base sequence of a gene DNA or conducting a gene diagnosis by analyzing a number of items simultaneously in order to raise the reliability of operation as pointed out above.

One of the problems to be solved for probe arrays formed by a group of a plurality of probe species is how to mount as many probes of different species, DNA probes having different base sequences for example, as possible on a single carrier. Differently stated, it is a problem of how to mount probes in array as densely as possible.

U.S. Pat. No. 5,424,186 describes a technique of preparing an array of DNA probes having respective base sequences that are different from each other by means of a stepwise elongation reaction of DNAs conducted on a carrier by utilizing photodecomposable protective groups and photolithography. With the proposed technique, it is possible to prepare a DNA probe array carrying DNAs of more than 10,000 different kinds that are different from each other in terms of base sequence per 1 $cm^2$. The process of synthesizing a DNA by means of a stepwise elongation reaction, using this technique, comprises a photolithography step in which dedicated photomasks are used respectively for the four different kinds of base (A, T, C, G) in order to selectively elongate any of the bases at a predetermined position of the array so that consequently DNAs of different species having desired respective base sequences are synthetically produced and arranged on a substrate in a predetermined order. Then, the cost and the time required for preparing such a probe array rise as the DNA chain length increases. Furthermore, since the efficiency of nucleotide synthesis is not 100%, the ratio of DNAs that are defective in terms of the designed base sequence is not negligible. Additionally, when photodecomposable protective groups are used for the synthesis process, the efficiency of synthesis is rather poor if compared with the use of ordinary acid-decomposable protective groups. Therefore, the ratio of the DNAs that show the designed respective base sequences in the ultimately obtained array can be relatively small.

Besides, with the above identified known technique, since the products formed synthetically and directly on a carrier have to be used without any modification, it is not possible to sort out the DNAs having a defective base sequence from the DNAs having the designed respective base sequences and eliminate the former for the purpose of refining. There is also a problem that it is not possible to confirm the base sequences of the DNAs synthetically formed on the carrier and ultimately obtained as an array. This means that, if a base has not been subjected to predetermined elongation in a given elongation step probably because of an error or another in the step and hence the obtained probe array is not good, any screening operation using such a defective probe array gives rise to false results but there is no way of preventing such a problem from taking place. In short, absence of confirmation of base sequences is the largest and most intrinsic problem of the above identified known technique.

Apart from the above technique, techniques of manufacturing a probe array by synthesizing DNAs for probes in advance in a refined manner, confirming, if necessary, their respective base lengths and applying the DNAs to a carrier by means of an appropriate device such as a microdispenser are also known. PCT Patent Publication WO95/35505 describes a technique of applying DNAs onto a membrane by means of capillaries. With this technique, it is theoretically possible to prepare a DNA array having about 1,000 DNAs per 1 $cm^2$. It is basically a technique of preparing a probe array by applying a probe solution to a predetermined position of a carrier for each probe by means of a single capillary-shaped dispensing device and repeating this operation. While no problem may arise when each probe is applied with a dedicated capillary-shaped dispensing device, a mutual contamination problem will occur if a small number of capillary-shaped dispensing devices are used repeatedly for the operation, so that the capillary-shaped dispensing devices have to be cleaned sufficiently each time a new probe species is brought in to avoid such a mutual contamination problem. Additionally, the position where each probe solution is applied needs to be controlled accurately. Therefore, this technique is not suited for preparing a probe array comprising a wide variety of probes that are arranged densely. Still additionally, the operation of applying a probe solution to the carrier is conducted by tapping the capillary tip to the carrier and hence not satisfactory in terms of both reproducibility and reliability.

There are also known techniques of applying a solution of a substance necessary for conducting an operation of DNA solid phase synthesis on a substrate in each elongation step by utilizing an ink-jet method. For example, European Patent Publication EP 0 703 825 B1 describes a technique of synthesizing DNAs of a plurality of different species having respective predetermined base sequences in a solid phase by applying nucleotide monomers and activators by means of respective piezo jet nozzles for the purpose of solid phase synthesis of DNAs. This application technique utilizing an ink-jet method is reliable in terms of reproducibility of the rate of application if compared with a solution application technique utilizing capillaries and also provides advantages for realizing high density probe arrays because the nozzle structure of the ink-jet system can be miniaturized. However, this technique is basically an application of a stepwise elongation reaction on a carrier and hence is not free from certain problems including that of being unable to confirm the base sequences of the DNAs synthetically formed on the carrier as pointed out earlier to be the largest problem or the technique according to U. S. Pat. No. 5,424,186. While the problem of conducting a cumbersome photolithography operation, using a dedicated mask in each elongation step, is dissolved with this technique, this technique is still accompanied to a certain extent by problems in terms of fixing predefined probes at respective positions, which is the requirement to be indispensably met for forming a probe array. It should be noted here that the above cited EP 0 703 825 B1 only describes a method of using a plurality of piezoelectric jet nozzles that are formed independently. The use of a small number of such nozzles is not suited for preparing high density probe arrays like the above described method of using capillary-shaped dispensing devices.

Japanese Patent Application Laid-open No. 11-187900 discloses a method of forming spots containing probes on a solid phase by causing droplets of probe-containing liquid to adhere to the solid phase by means of thermal ink-jet heads.

When preparing a probe array by utilizing an ink-jet method, it is desired from the viewpoint of high density arrangement to fix probes of as many different types as possible within a given area in order to improve the detection efficiency of diagnostic operations and avoid the need of preparing specimens to a large quantity. Additionally, it is necessary to accurately apply specific probes to respective intended positions from the viewpoint of reliability. It is also desired that only a right probe is fixed at an intended position from the viewpoint of eliminating diagnosis errors.

As pointed out above, more accurate position control will be required in the near future for fixing probes highly densely. However, with known probe fixing methods that utilize a conventional ink-jet process, it is often impossible to apply liquid accurately to a desired position as the liquid ejecting operation is conducted by regulating the relative positions of the carrier and the ink-jet head, visually confirming the posture of the entire carrier.

Additionally, when manufacturing a probe carrier by ejecting liquid in a number of times, using an ink-jet method, the carrier may have to be aligned with the ink-jet head for each liquid-ejecting operation. Then, when a liquid-ejecting operation is concluded, the entire probe formed by applying the liquid is positionally checked before the next liquid-ejecting operation is conducted. However, if the probe solution applied to the carrier by the last liquid-ejecting operation dries, it will no longer be possible to visually ascertain that the probe solution has been applied to the right position on the carrier. Therefore, the next liquid-ejecting operation has to be conducted before the probe solution applied to the carrier in the last liquid-ejecting operation dries and after visually confirming that the probe solution has been applied to the right position to make the manufacture of such a probe carrier disadvantageous. Furthermore, this technique is accompanied by additional problems including that the operation of visually aligning the carrier and the ink-jet head is time consuming and the number of points to be used for observing the alignment of the carrier and the ink-jet head is limited to make the alignment inaccurate. Moreover, if the probe carrier is turned upside down relative to the ink-jet head during the operation of manufacturing the probe carrier, it cannot be checked, if the carrier is transparent, simply by observing the carrier.

Japanese Patent Application No. 11-099000 discloses a method of fixing probes at intended respective positions by forming a division wall (also referred to as "black matrix"), or a light-shielding layer, on the carrier typically by means of photolithography in order to enhance the contrast produced by fluorescent light in the detection step. However, as a result of intensive research efforts, the inventors of the present invention found that, unless the ink-jet head is not accurately aligned relative to the probe carrier, the probe solutions of adjacently located apertures (wells) with a division wall interposed therebetween can become mixed with each other (to produce a mixed solution) so that it may no longer be possible to apply the proper probes to the intended position on the probe carrier. Then, the probe carrier will not function properly. Additionally, if the positions of ejection points are displaced, the probe solution in each well can be spread unevenly to expose the surface of the probe carrier over a large area. Then, there arise problems such as unreliable detection, difficulty of quantification, appearance of bright blank areas (also referred to simply as "blank areas") and an increase of unspecified bonds. "Blank areas" are produced when the ejected probe solutions do not satisfactorily wet the probe carrier nor spread in the respective regions enclosed by a division wall. Then, probes will not be formed uniformly on the probe carrier as a result of applying probe solutions to the latter. When probes that are not uniformly formed are subjected to hybridization with respective specimens such as DNAs, the latter may not only become mated with the respective probes having a specific base sequence but also adhere to the substrate (e.g., glass) that is exposed in the blank areas to consequently reduce the contrast produced by fluorescent light during the operation of observation. FIGS. 3A and 3B of the accompanying drawings schematically illustrate this problem. In FIGS. 3A and 3B, reference symbols 31, 32, 33 and 34 respectively denote a transparent substrate, a division wall, a probe solution and a blank area. FIG. 3B is a cross sectional view taken along line 3B—3B in FIG. 3A.

Referring to FIGS. 3A and 3B, a blank area appears when a probe solution 33 does not wet corners showing a complex profile and/or a narrowly opened region nor spread well or when the probe solution 33 is applied thinly near the surrounding division wall 32. While the phenomenon of appearance of blank areas may be reduced when probe solutions are applied at an enhanced rate, it will not be totally eliminated.

Photoresist is typically used for forming a division wall 32. Therefore, various ingredients of photoresist can adhere to and remain in the inside of the openings of the division wall 32. The adherent residues can prevent probe solutions from wetting the probe carrier and spreading. Therefore, improvements are needed to obtain highly reliable fine probe carriers that can be manufactured with a high yield.

Furthermore, it is a problem to be solved urgently that the time required for aligning the ink-jet head and the probe carrier needs to be reduced because the operation of adjusting their relative positions and the use of a detector for detecting the overall profile of the black matrix for the purpose of alignment are time consuming and hence raise the manufacturing cost per chip.

SUMMARY OF THE INVENTION

In view of the above identified recent technological problems, it is therefore an object of the present invention to provide a probe fixing carrier that allows the operation of aligning the ejection head and the carrier to be conducted accurately and quickly when ejecting probe solutions onto the probe fixing carrier by means of an ink-jet system and also the operation of locating a target substance accurately and quickly when detecting and quantifying the latter.

Another object of the present invention is to provide a probe carrier that can effectively prevent the probe solutions being applied to respective probe fixing regions that are located adjacently and enclosed by a division wall from being mixed with each other and allows the probe solutions to sufficiently spread in the respective regions so as to prevent blank areas from being produced therein so that reliable probe carriers may be manufactured at a high yield.

In a first aspect of the invention, the above objects and other objects of the invention are achieved by providing a method of manufacturing a probe carrier carrying probes of a plurality of species fixed at respective specific different positions on the carrier and adapted to be specifically bonded to a target substance, said method comprising:

a step of forming one or more than one indexes on said carrier at a position out of said specific positions; and a step of applying solutions respectively containing said probes to said respective specific positions by referring to said indexes.

In a second aspect of the invention, there is provided a probe carrier carrying probes of a plurality of species fixed at respective specific different positions on the carrier and adapted to be specifically bonded to a target substance, said probe carrier comprising:

one or more than one indexes formed on said carrier at positions out of said specific positions.

In a third aspect of the invention, there is provided a probe fixing carrier for carrying probes of a plurality of species fixed at respective specific different positions on the carrier and adapted to be specifically bonded to a target substance, said probe fixing carrier comprising:

one or more than one indexes formed on said carrier at positions out of said specific positions.

In a fourth aspect of the invention, there is provided a method of locating the position of the probe specifically bonded to a target substance out of a number of probes of a plurality of species by causing said probes of a plurality of species carried on the carrier to contact the target substance, said method comprising:

a step of locating the position of the probe specifically bonded to the target substance by referring to indexes formed at positions out of the specific positions carrying said probes of a plurality of species.

BRIEF DESCRIPTION OF THE DRAWINGS

FIG. 9 is a schematic block diagram of the controller of a probe carrier manufacturing apparatus that can be used for the purpose of the present invention.

DESCRIPTION OF THE PREFERRED EMBODIMENTS

Now, the present invention will be described in greater detail by referring to the accompanying drawings that illustrate preferred embodiments of the invention.

Figure 1A:
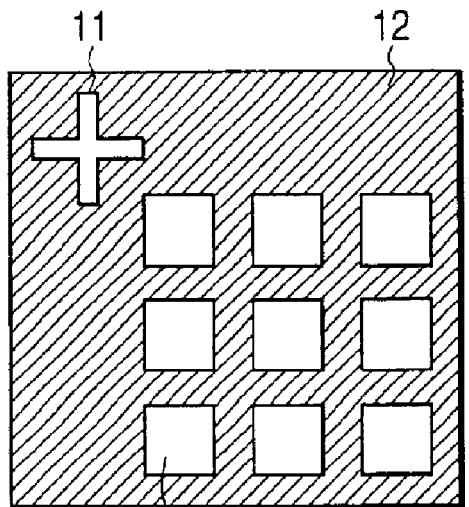
FIGS. 1, 1A and 1B are schematic views of an embodiment of probe carrier or probe fixing carrier according to the invention and having indexes formed thereon.
Figure 1B:
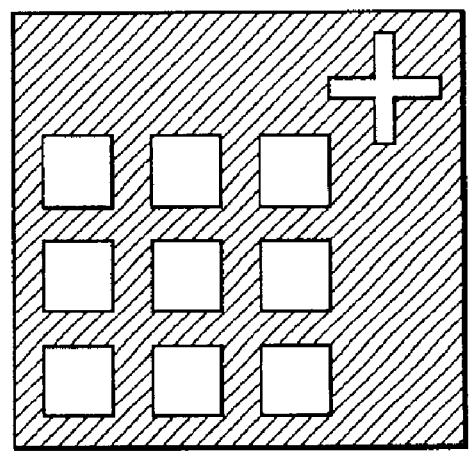
Figure 1:
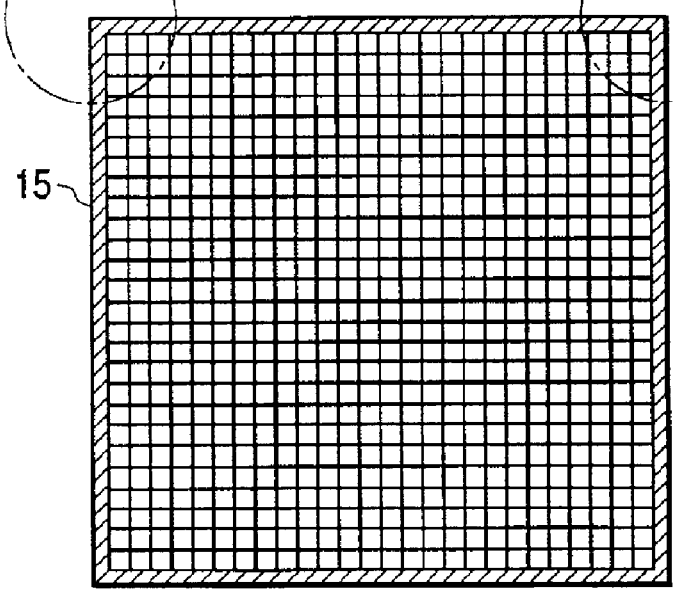

FIGS. 1, 1A and 1B are schematic views of an embodiment of probe carrier or probe fixing carrier according to the invention and having indexes formed thereon. Referring to FIGS. 1, 1A and 1B, there are shown indexes 11, a black matrix 12, openings (wells) 13, a chip 14 and a peripheral area 15 of the chip 14. In the case of FIGS. 1, 1A and 1B, the indexes 11 are surrounded by the black matrix 12 to produce recessed openings. Note that FIGS. 1, 1A and 1B only show an example of index arrangement. Firstly, indexes to be used for manufacturing a probe carrier according to the invention will be described in greater detail below. The term of "probe" as used herein refers to a single stranded nucleic acid having a base sequence complementary relative to all or part of the base sequence of a target nucleic acid and adapted to detect the target nucleic acid as a result of being specifically hybridized with the base sequence of the target nucleic acid.

The indexes that are utilized when manufacturing a probe carrier according to the invention are typically used for the purpose of aligning and positionally regulating the carrier and the probe application means when fixing the probe. In the case of the illustrated embodiment, probe solutions containing probes are ejected from an ejection head onto a carrier and the positions on the probe carrier where the solutions are applied can be accurately located by using the indexes as alignment marks when fixing the probes on the probe carrier by means of an ink-jet system. With this arrangement, the positions where ejected liquid is applied to the probe carrier can be accurately located and the alignment of the ejection head and the carrier can be regulated quickly, although the present invention is by no means limited to the above described arrangement. Any method that involves relative positional regulation of the carrier and the probe application means at the time of fixation may be used for the purpose of the present invention. Additionally, the indexes may also be used as reference points for obtaining alignment information on the scanned image or address information on the positions of the plurality of probes at the time of the detecting operation. The present invention provides remarkable advantages for achieving such combined objectives. For example, the indexes may be used firstly as alignment marks for aligning the carrier and the probe application means at the time of fixing the probes on the carrier and subsequently as alignment marks for detecting probes and obtaining address information on the probes. In short, the indexes can be used for all the operations related to the probe carrier.

The indexes may be formed to show a projecting or recessed profile relative to the carrier. They may alternatively be formed in the carrier. For example, projections having a recessed profile may be formed on the carrier. Such projections may be formed by using resin and made to show a desired profile by photolithography. If the carrier is made of glass, indexes may be formed directly in the carrier by laser cutting or diamond cutting, although the indexes are preferably formed by using resin from the viewpoint of ease of detection. Preferably, the indexes are formed as openings of a division wall that is formed on the carrier.

In the case of a chip where a plurality of probes are arranged two-dimensionally and fixed, fixing regions are preferably formed by such a division wall to show a matrix as illustrated in FIG. 1. Then, indexes are formed in a non-fixing region having a profile different from the members of the division wall so that the operation of relative positional regulation of the carrier and the probe application means can be conducted accurately and the liquid ejected onto the carrier can be prevented from unnecessarily swelling from the right regions by the division wall if the ejected liquid is inadvertently displaced by gas flows. As a result, the ejected solutions will be accurately and reliably applied to the respective openings. With this arrangement, it is only necessary to detect the indexes by appropriate detection means so that the operation of relative positional regulation of the carrier and the probe application means can be carried out in a short period of time to reduce the time necessary for manufacturing the chip if compared with the conventional alignment method having an initial step of detecting positional information on the entire chip (e.g., by visual detection or by means of a CCD).

The division wall is preferably made of a resin or metal composition having a light-shielding effect. A method of producing indexes having such a division wall will be described in greater detail hereinafter.

Each probe array is provided with at least an index. A DNA chip is formed by combining a number of probe arrays. From the viewpoint of aligning the ink-jet head and the carrier at the time of ejecting probe solutions by means of an ink-jet system and detecting the position of the target substance accurately and quickly, it is desired that a plurality of indexes are proved on each chip. Accurate two-dimensional positional information can be obtained by scanning two or more than two indexes. Additionally, if the ejection head is inclined inaccurately relative to the carrier, the inclination of the ejection head can be adjusted by referring to the two or more than two indexes. The plurality of indexes do not need to show a same and identical profile. Indexes having different shapes may be used for the purpose of the invention.

Indexes may be formed for each probe array at any positions so long as they are located outside the probe fixing regions (on the carrier where the respective probes are fixed) as shown in FIGS. 1, 1A and 1B. They may be arranged in a peripheral area of the chip as in the case of FIGS. 1, 1A and 1B, in areas located between adjacent probes or in a division wall separating openings (wells) if the division wall is formed on the carrier. When indexes are formed in areas located between adjacent probes, the peripheral area of the chip may also be used for probe fixing regions so that more probes can be mounted on the chip to raise the density of probe arrangement. If, on the other hand, indexes are formed in the peripheral area of the chip, they are preferably formed at positions located as close as possible to the probe fixing regions from the viewpoint of accurate alignment.

While each index may have any form, it is preferably made to show a profile that allows an accurate and quick alignment of the ejection head and the carrier for the operation of ejecting probe solutions and an easy detection of the position of the target substance. Each index may have the form of a cross, a circle, a square, a rectangle, an isosceles triangle, a butterfly or the like. The form of a cross provides an advantage that it can be formed with ease in the chip manufacturing process and its center can be located easily. A cross-shaped index preferably has a transversally part that is 30 $\mu$m wide and 150 $\mu$m long and a vertical part that is also 30 $\mu$m wide and 150 $\mu$m long.

The dimensions of each index can be modified appropriately depending on the required accuracy of alignment and positional detection. When a division wall is arranged on the carrier, each index may typically be made to have a size substantially same as that of each opening (well). If indexes are formed at the time of forming a division wall, they have a thickness same that of the latter. Then, the thickness is preferably found within a range between 0.5 $\mu$m and 100 $\mu$m.

An alignment mark that is used with the method of manufacturing a probe carrier according to the invention can be utilized for both aligning the carrier and the probe application means at the time of preparing the probe carrier and detecting the position of the target substance. In other words, separate indexes do not need to be provided for the two operations so that consequently the area required for a probe non-fixing region can be reduced. Furthermore, the index can be used as mark for discriminating the front surface and the back surface of the carrier.

For the purpose of fixing probes, it is not necessary that all the wells are provided with respective probes. In other words, the number, the types and the positions of probes may be modified appropriately. Preferably, information on the positions where probes are fixed can be obtained also by referring to the indexes. For instance, the profiles and the number of the indexes may be modified according to the number and the types of probes to be fixed and information on the positions of the probes can be obtained at the time of the target substance detecting operation.

When a division wall is provided on the carrier and the material used for forming the division wall has a light-shielding effect, the division wall provides a light-shielding effect during the detecting operation involving the use of fluorescent light so that the indexes function satisfactorily during the operation of observation provided that openings of division wall are used as indexes. The alignment operation can be conducted satisfactorily regardless of the environment of the operation when a material that may be a fluorescent substance and operates advantageously for the operation of observation is provided on the openings that are formed by members having a light-shielding effect.

Now, embodiments of probe fixing carrier and probe carrier carrying probes and a method of manufacturing such a carrier according to the invention will be described by referring to the accompanying drawings particularly in terms of a case where the probe non-fixing region occupies a division wall.

Figure 2A:
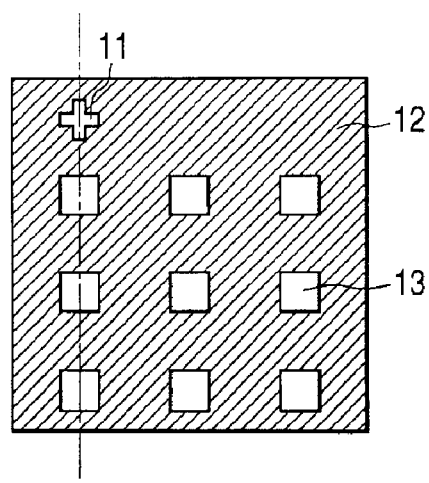
FIGS. 2A, 2B, 2C, 2D, 2E, 2F, 2G and 2H are schematic views of a probe carrier, illustrating different manufacturing steps of the method of manufacturing a probe carrier according to the invention.

FIGS. 2A through 2H are schematic views of a probe carrier, illustrating different manufacturing steps of the method of manufacturing a probe carrier according to the invention. Now, the steps will be described below. In FIGS. 2A through 2H, there are shown an index 11, a division wall 12 having the index 11, wells 13, a carrier 21, a division wall layer 22 preferably made of a resin or metal composition, a photoresist mask 23, a probe solution ejection head 24 and probe solutions 25. FIG. 2A is a schematic plan view of the embodiment, where the index 11 is cross-shaped and surrounded by the division wall 12 to form a recessed opening. While the center of the opening is made to agree with the center of the cross for the purpose of convenience, the present invention is by no means limited to such an arrangement.

Step (a): A Carrier for Probe Arrays.

Figure 2B:
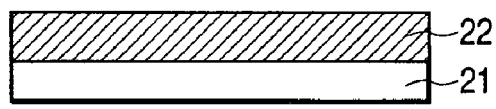

A probe fixing carrier 21 is prepared (see FIG. 2B). The expression of a "carrier" for probe arrays as used herein refers to one for carrying probes. Hence, any carrier that can carry probes and does not obstruct the operation of detecting a target substance can be used for the purpose of the invention. Materials that can be used for a carrier for probe arrays include glass substrates, silicon substrates, metal substrates and resin substrates such as acryl resin substrates as well as hollow objects and tubular carriers. A carrier for probe arrays may or may not be surface-treated for hydrophilicity. An optically transparent substrate or, in some cases, an optically black substrate may preferably used when a reaction is optically detected. Carriers that can preferably be used for the purpose of the invention include glass substrates such as synthetic quartz substrates and fused quartz substrates, silicon wafers and resin substrates such as acryl substrates, polycarbonate substrates, polystyrene substrates and vinyl chloride substrates, to which black pigment or dye may or may not be added. Black pigments that can be used for the purpose of the invention include carbon black and organic black pigments. Preferably, the carrier surface is treated in advance so as to make it have a structure adapted to react with various organic functional groups to be introduced to probes and form a covalent bond and also receive one or more than one organic functional groups. Examples of preferable combinations of a functional group introduced to a terminal of the probe and a functional group to be introduced to the carrier surface so as to be bonded with the former functional group include a combination of thiol (—SH) (nucleic acid probe terminal) and a maleimide group (carrier surface) and a combination of an amino group (nucleic acid probe terminal) and an epoxy group (carrier surface).

The surface of the carrier 21 may be subjected to a surface treatment, which may be a plasma treatment, a UV treatment, a coupling treatment or a treatment with albumin.

Step (b): Preparation of a Resin Composition Layer

Then, a division wall layer 22 is formed on the carrier 21 in order to produce a division wall 12 for forming wells 13 and indexes 11 that are openings (see FIG. 2B). When the division wall 12 is a black light-shielding layer, it may also be referred to as black matrix.

The division wall 12 is preferably a light-shielding layer that blocks light between any adjacent probe fixing regions. Then, the division wall 12 may be realized in the form of a black matrix or black stripes. As the division wall 12 is made to operate as a light-shielding layer, the detection accuracy (SN ratio) can be remarkably improved particularly when the hybridization of a probe and a target substance on the carrier is optically detected (by detecting fluorescent light).

A metal selected from chromium, aluminum and gold may be used for the division wall layer 22. The use of black chromium is preferable from the viewpoint of reliability particularly when it is combinedly used with a transparent substrate for an optically detecting operation because it is highly light-shielding. However, it should be noted that metal is more often than not hydrophilic and the division wall layer 22 is generally made to have a film thickness of several thousands angstroms from the viewpoint of uniform film thickness when it is formed by evaporation or some other similar technique. These characteristics of a metal division wall layer 22 need to be taken into consideration when it is used.

A material that is hydrophobic relative to the substrate is advantageously be used for forming the division wall layer 22. Examples of materials that can be used for the division wall layer 22 include epoxy type resins, acryl type resins and polyimide (or polyimideamide) type resins, urethane type resins, polyester type resins and polyvinyl type resins, which may or may not be photosensitive. The division wall layer 22 preferably is resistant against hot temperature equal to or higher than 250° C. The use of epoxy type resins, acryl type resins or polyimide type resins is preferable from the viewpoint of thermal resistance.

The division wall 12 can be made to be an advantageous light-shielding layer by using a resin composition layer 22 that is made of a black resin composition where a light-shielding agent is dispersed. Carbon black is preferably used as light-shielding agent from the viewpoint of providing the division wall 12 with an enhanced level of water repellency and an appropriate degree of surface coarseness. Carbon black materials that can be used for the purpose of the present invention include those produced by way of a contact process such as channel black, roller black and disk black, those produced by way of a furnaced process such as gas furnaced black and oil furnaced black and those produced by way of a thermal process such as thermal black and acetylene black, of which the use of channel black, gas furnaced black or oil furnaced black is particularly favorable. Black organic pigment may be used alternatively. It is also possible to use commercially available black resist.

The division wall layer 22 can be formed by way of an appropriate process selected from spin coating, roll coating, bar coating, spray coating, dip coating and printing.

If no division wall 12 is formed on the carrier, the above division wall forming process will be omitted as a matter of course.

Step (c): Preparation of Division Wall and Alignment

Figure 2C:
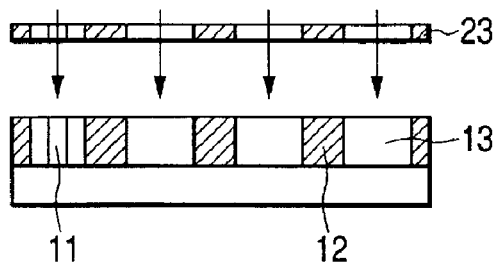

The division wall 12 is formed simultaneously for both the indexes 11 and the wells 13 by photolithography (see FIG. 2C).

With a method of forming the pattern of the division wall 12 and that of the indexes 11, a photoresist mask 23 having the pattern of the wells 13 and that of the indexes 11 is laid on the resin coating the surface of the carrier 21 in the above step (b), and the resin layer is selectively exposed to light and developed for the purpose of patterning in order to produce a division wall 12 having a plurality of wells 13 that are probe fixing regions and indexes showing a recessed profile. The profiles, the positions and the numbers of indexes 11 are described above in detail. Thus, the indexes 11 are produced by using a photoresist mask showing a pattern corresponding to that of the indexes. If a photosensitive resin is used, the resin itself may be used as photo mask and subjected to a patterning operation, using a photolithography process. Photosensitive resin materials that can be used for the purpose of the invention include UV resist, DEEP-UV resist and UV setting resins. The division wall of the black matrix is preferably made to become water repellent typically by means of a dry etching operation that is conducted after the patterning operation. If a photosensitive material is used for the resin composition layer 22, the water repellency of the division wall 12 can be improved by baking the pattern obtained by patterning the resin layer 22. A major advantage of making the division wall 12 show water repellency is that probe solutions can be applied smoothly to the intended respective wells if the probe solutions hit the respective openings with a slight degree of positional displacement. Note that the openings 13 are usually formed as wells.

The profile of the division wall openings 13 that operate as probe fixing regions can be appropriately defined by taking the easiness of forming and handling and the operability at the time of detection of the target substance into consideration. While the profile is not particularly limited and may be polygonal or elliptic, it is preferable that the division wall openings 13 show a simple profile such as square, rectangular or circular. The arrangement of the openings on the carrier may be appropriately modified if desired.

The surface area of the probe solution that is applied to a single opening (well) 13 is generally between 0.01 $\mu m^2$ (e.g., 0.1 $\mu m \times 0.1$ $\mu m$) and 40,000 $\mu m^2$ (e.g., 200 $\mu m \times 200$ $\mu m$), although it is defined as a function of the size of the array itself and the density of the array matrix. Therefore, the size and the capacity of each opening (well) to which a probe solution is applied can be determined on the basis of the surface area of the probe solution. The depth of each opening (well) is preferably between 0.5 $\mu m$ and 100 $\mu m$, although it may vary depending on the process selected for producing the openings (wells). The volume (capacity) of each opening is defined by the area and the depth thereof. For example, a method as described in Japanese Patent Application No. 11-099000 may be used without modification for producing such openings (wells).

Figure 5A:
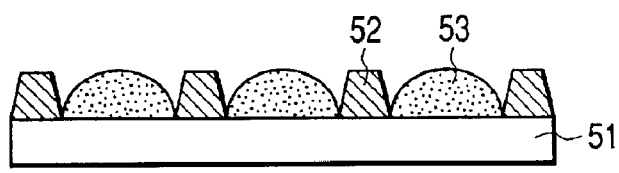
FIGS. 5A and 5B are schematic cross sectional views of another embodiment of probe carrier according to the invention.
Figure 5B:
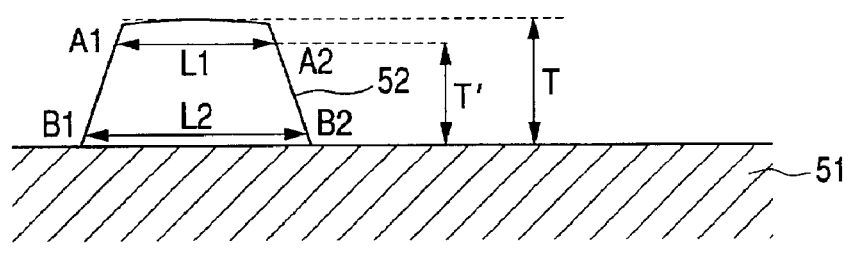
Figure 6:
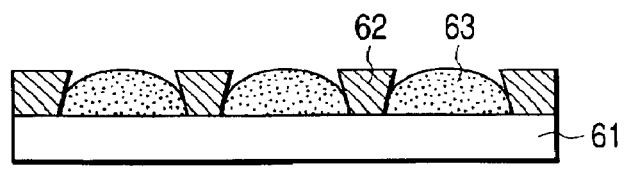
FIG. 6 is a schematic cross sectional view of still another embodiment of probe carrier according to the invention.

The division wall 52 may show a trapezoidal cross section as shown in FIG. 5A. FIG. 5B is an enlarged cross sectional view of a part of the division wall of FIG. 5A. Alternatively, the division wall may show an inverted trapezoidal cross section as shown in FIG. 6.

Referring to the cross sectional view of a division wall of FIG. 5B, A1 and A2 indicate the part of the division wall located at 80 to 100% of the height of the top of the division wall as viewed from the bottom of the cross section of the division wall and B1 and B2 indicate the part of the division wall that directly contacts the carrier as shown in the cross section of the division wall. In FIG. 5B, L1 is the distance between A1 and A2 and L2 is the distance between B1 and B2 while T indicates the height of the top of the division wall and T' indicates the height of A1 and A2 showing the part of the division wall located at 80 to 100% of the height of the top of the division wall. The span between A1 and B1 and the span between A2 and B2 are referred to as lateral surfaces of the division wall herein.

If the average value of the length L1 that is parallel to the substrate and represents the part of the division wall located at the height T' that is 80 to 100% of the height T of the top of the division wall as measured from the bottom to the top of the cross section of the division wall 52 is 'a' and the length L2 of the bottom of the cross section of the division wall 52 is 'b', it is preferable that the relationship of a and b satisfies the requirement of formula 1.3≧a/b≧0.7 in the cross section of the division wall 52. If the ratio of a/b is smaller than 0.7, uneven probes are formed by probe solutions. Such probes are undesirable from the viewpoint of uniformity of probes and can give rise to a problem of blank areas. The ratio of a/b can be made greater than 1 as shown in FIG. 6. Then, the cross section of the division wall 62 is inversely trapezoidal. Such an arrangement is advantageous because each probe solution is partly hidden by the corresponding umbrella of the division wall 62 to reduce the "blank area", if any, at the time of detection. Note, however, the entire structure will become unstable when the ratio of a/b is excessively large. It is preferable that a/b is not greater than 1.3.

If no division wall 12 is formed on the carrier, this step is omitted and desired indexes are simply formed. As described above, projections having a recessed profile may be formed on the carrier by using a resin material and a photolithography process. Alternatively, if the carrier 21 is a glass substrate, indexes having a recessed profile may be directly formed in the substrate by laser cutting or by means of a diamond cutter.

Step (d): Dry Etching Treatment

Figure 2D:
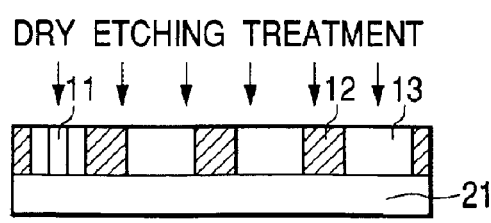

The carrier 21 on which a division wall 12 is formed is preferably subjected to a dry etching treatment (see FIG. 2D). More specifically, gas containing at least oxygen, argon or helium is introduced for a reduced pressure plasma treatment process in which the carrier 1 is irradiated with plasma in a reduced pressure environment or an atmospheric pressure plasma treatment process in which the carrier 1 is irradiated with plasma in an atmospheric pressure environment.

As a result of the dry etching treatment, polutant that comes to adhere to the surface of the carrier 21 in the step of forming the division wall 12 is removed and the surface is cleaned to show affinity for the probe solutions 25 applied to it in a subsequent step so that the probe solutions 25 may be effectively dispersed in the respective openings 13 after a subsequent water treatment step. Further more, the surface of the division wall 12 is made coarse to increase its water repellency as a result of the dry etching treatment.

Step (e): Plasma Treatment

Figure 2E:
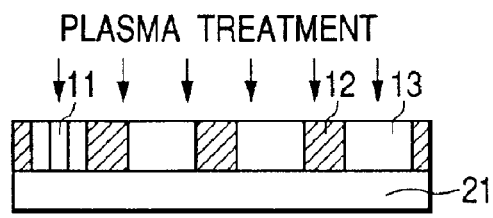

The carrier 21 that is subjected to a dry etching treatment, if necessary, is subsequently subjected to a plasma treatment where the carrier 21 is irradiated with plasma in a gas atmosphere containing at least fluorine atoms (see FIG. 2E). As a result of the plasma treatment, fluorine or a fluorine compound in the introduced gas penetrates the surface layer of the division wall 12 to increase the water repellency of the surface of the division wall 12.

A particularly high degree of water repellency is realized when the division wall 12 is formed by using a resin composition containing carbon black. The reason for this may be that carbon black comes to be exposed to the surface of the division wall 12 as a result of the dry etching treatment of step (d) and chemically bonded with fluorine or the fluorine compound as a result of the plasma treatment of this step. Therefore, it is desirable that the division wall 12 is made to contain carbon black for the purpose of the present invention.

One or more than one halogen gases selected from $CF_4$, $CHF_3$, $C_2F_6$, $SF_6$, $C_3F_8$ and $C_5F_8$ are preferably used as gas containing at least fluorine atoms and introduced in this step. Particularly, the use of $C_5F_8$ (octafluorocyclopentene) is advantageous because it does not destroy ozone at all and, at the same time, shows a short life of 0.98 years in the atmosphere, which is very short if compared with other gases ($CF_4$:50,000 years, $C_4F_8$:3,200 years). Thus, it shows an earth warming coefficient of 90 (accumulated value for 100 years as determined on the basis of $CO_2$=2), which is also very small if compared with other gases ($CF_4$:6,500, $C_4F_8$:8,700). Therefore, the use of $C_5F_8$ is very advantageous from the viewpoint of protection of the ozone layer and the environment of this planet. The use of this gas is highly recommended for the purpose of the present invention.

If necessary, oxygen, argon and/or helium may be added to the gas introduced in this step. The degree of water repellency that is obtained in this step can be controlled by using a mixture gas containing one or more than one halogen gases selected from $CF_4$, $CHF_3$, $C_2F_6$, $SF_6$, $C_3F_8$ and $C_5F_8$ and $O_2$. However, the oxidizing reaction of O2 becomes dominant to obstruct the effort for enhancing the water repellency and the resin can be remarkably damaged if the mixing ratio of $O_2$ exceeds 30%. Therefore, the mixing ratio of $O_2$ needs to be less than 30% if a mixture gas is used in this step.

Low frequency discharge, high frequency discharge, microwave discharge or some other appropriate technique may be used for generating plasma for the purpose of this step and the preceding step of dry etching process. The pressure, the gas flow rate, the discharge frequency, the processing time and other conditions of the plasma irradiation may be selected appropriately.

Figure 7:
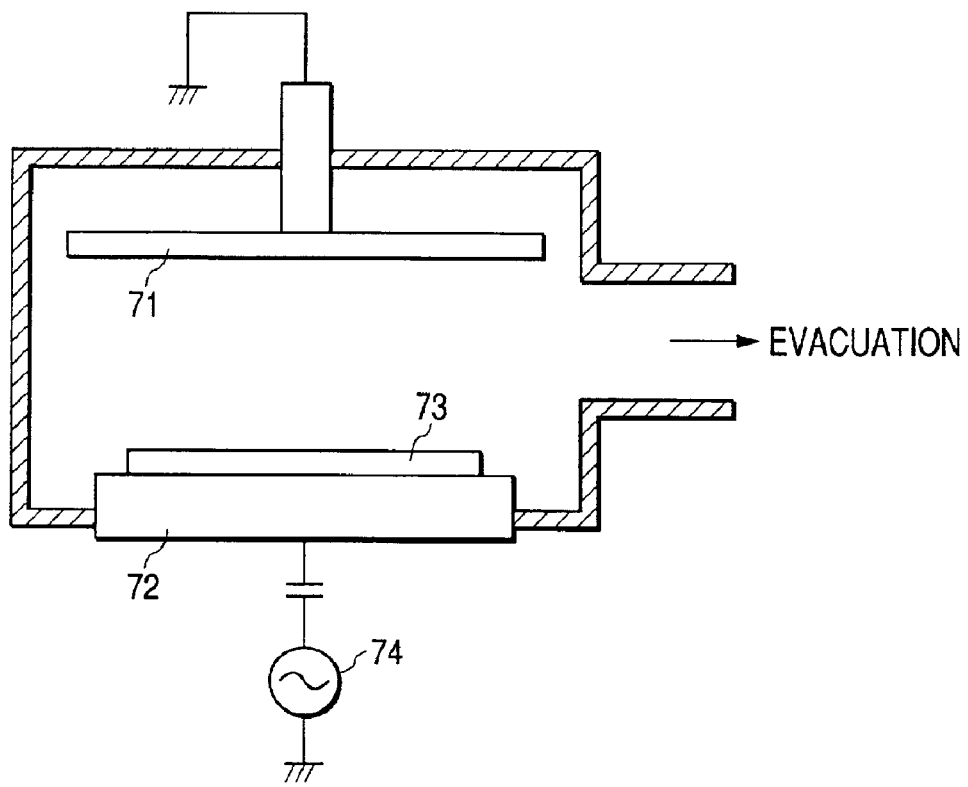
FIG. 7 is a schematic illustration of a plasma generator that can be used for a method of manufacturing a probe carrier according to the invention.
Figure 8:
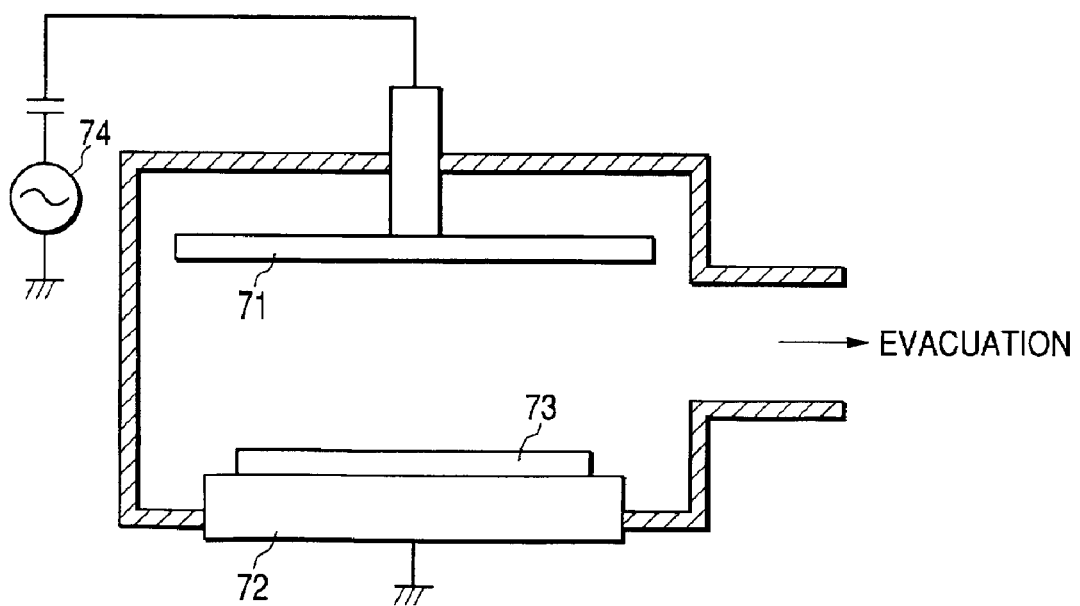
FIG. 8 is a schematic illustration of another plasma generator that can also be used for a method of manufacturing a probe carrier according to the invention.

FIGS. 7 and 8 schematically illustrate plasma generators that can be used for the dry etching process and the plasma treatment of the present invention. In each of FIGS. 7 and 8, there are shown an upper electrode 71, a lower electrode 72, a carrier 73 to be treated and a high frequency power source 74. In each of the illustrated plasma generators, a high frequency voltage is applied to the two electrodes that are plate-shaped and arranged in parallel with each other to generate plasma. More specifically, FIG. 7 shows a plasma generator of the cathode coupling type, whereas FIG. 8 shows a plasma generator of the anode coupling type. With either system, the water repellency and the coarseness of the surface of the division wall 12 and the affinity for probe solutions of the surface of the carrier 21 can be made to show a desired degree by controlling the pressure, the gas flow rate, the discharge frequency, the processing time and other conditions of the plasma irradiation.

With the plasma generator of the cathode coupling type of FIG. 7, it is possible to reduce the duration of the dry etching treatment and hence is advantageous in this sense. On the other hand, the plasma generator of the anode coupling type of FIG. 8 is advantageous in that it does not unnecessarily damage the carrier 21. Therefore, either of the plasma generators may appropriately be selected for the dry etching treatment and the plasma treatment depending on the material of the carrier 21 and that of the division wall 12.

As a result of this step, the amount of the fluorine compound existing on the surface of the carrier 21 that is exposed in the openings 13 of the division wall 12 is reduced to less than a half of the original amount and the surface coarseness of the exposed surface is significantly raised if compared with the surface before this step.

Note that the effect of spreading probe solutions of the carrier is reduced if the carrier 21 is brought into contact with water and subsequently heated and dried at temperature exceeding 100° C. in this step. Therefore, the drying operation should be conducted at temperature lower than 100° C.

Step (f): Water Treatment

Figure 2F:
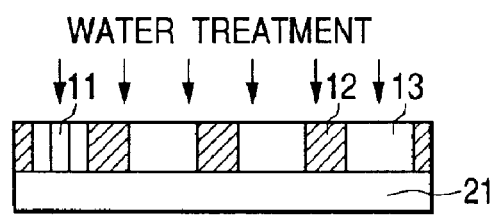
Figure 2G:
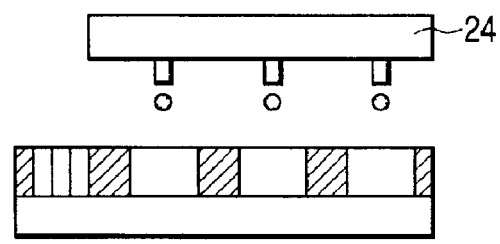
Figure 2H:
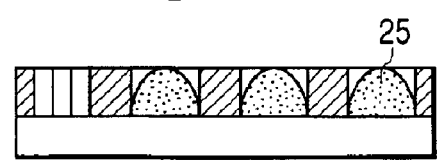
Figure 3A:
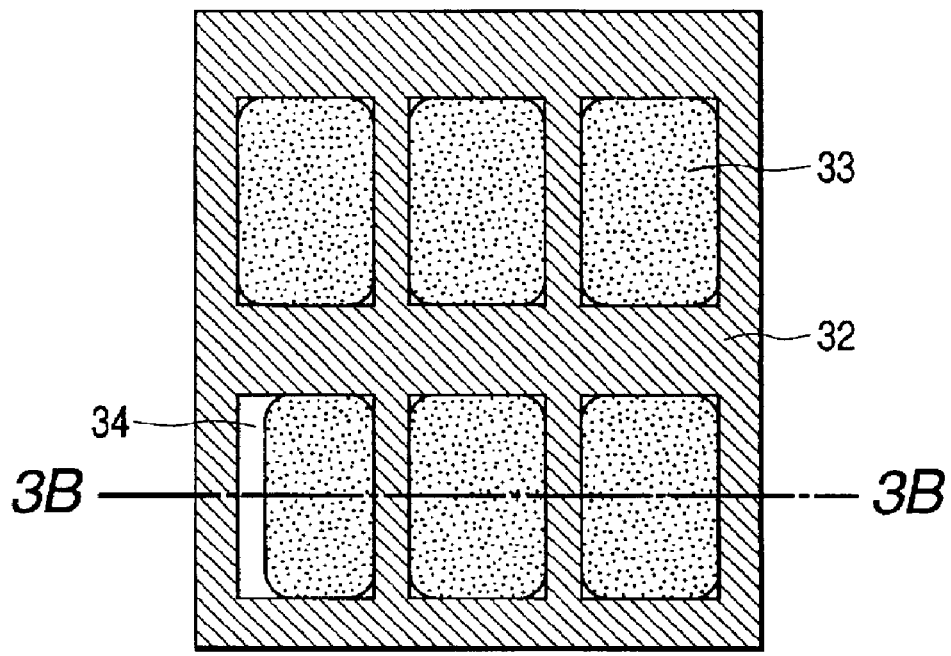
FIGS. 3A and 3B are schematic illustrations of a blank area that can be produced by a method of manufacturing a probe carrier, using an ink-jet system.
Figure 3B:
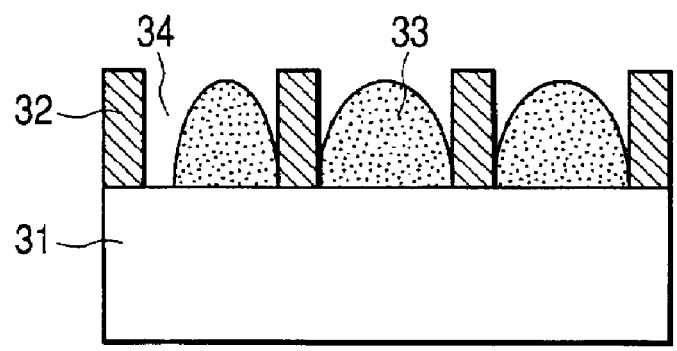
Figure 4:
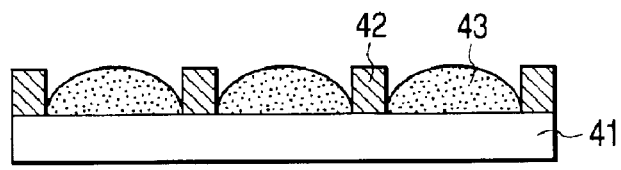
FIG. 4 is a schematic cross sectional view of an embodiment of probe carrier according to the invention.

The surface of the carrier 21 that is subjected to a plasma treatment is then brought into contact with water for a water treatment for the purpose of improving the effect of spreading probe solutions of the carrier 21 in the openings 13 of the division wall 12 (see FIG. 2F). As a result of this treatment, a probe solution can be made to sufficiently spread within an opening 13 if the amount of the applied probe solution is very small.

Preferably, pure water is used for the water treatment of this step. Any method may be used for bringing the carrier 21 into contact with water so long as it can perfectly bring them into mutual contact. Methods that can be used for this step include immersion into water and washing with water. However, if the division wall 12 shows a complex pattern on the carrier 21, the carrier 21 is preferably dipped into water and irradiated with ultrasonic waves simultaneously or washed with fine water drops under high pressure so that boundaries of the division wall 12 and the openings 13 and fine and delicate parts such as corners of the openings 13 may sufficiently contact with water.

While the temperature of water that is brought into contact with the carrier 21 is preferably high from the viewpoint of effectively improving the surface condition of the openings 13, it is advantageously between 20 and 60° C. from the viewpoint of economic efficiency of heating water.

Now, the water repellency and the hydrophilicity of the division wall and the probe fixing regions (openings) after the water treatment step will be discussed below. According to the invention, the division wall is made of a resin composition containing carbon black and then it is possible to provide a high contact angle of 120° or more for the water repellency of the surface of the division wall after the steps of plasma treatment and water treatment. According to the invention, the contact angle of water on the surface of the division wall 12 is more than 120°, preferably more than 135°, more preferably more than 150°, most preferably 180°, for the water repellency of the surface of the division wall 12 relative to pure water after the water treatment step. A mixed solution is liable to be produced so that probe solutions can not be applied to a large extent if the contact angle is less than 120°. Particularly, it will be difficult to manufacture a probe carrier showing a high detection sensitivity if the contact angle is less than 120°. With any comparable conventional methods, it is difficult to make the contact angle higher than 120° for the water repellency of the surface of the division wall and the contact angle is slightly less than 110° even if the probe carrier is made of PTFE (polytetrafluoroethylene) that is a highly water repellent material. To the contrary, according to the invention, probe solutions can be effectively prevented from being mixed with each other as the contact angle is made greater than 120° for the water repellency of the surface of the division wall.

As for the hydrophilicity of the openings 13 of the carrier 21, the contact angle is desirably not greater than 30° when measured by using pure water. As the contact angle is made less than 30° relative to probe solutions, the polutant that is made to adhere to the surface of the carrier 21 exposed in the openings 13 in the dry etching treatment of step (d) is removed to improve the ink spreading effect that is endowed in the subsequent water treatment step. Particularly, the contact angle is preferably not greater than 20° when measured by using pure water.

With regard to the water repellency of the division wall and the hydrophilicity of the probe fixing regions in the openings 13 of a probe fixing carrier 21 according to the invention and prepared in a manner as described above, the contact angle relative to each probe solution may vary depending on the solvent contained in the probe solution. An aqueous solution containing glycerol by 7.5 wt %, urea by 7.5 wt %, thiodiglycol by 7.5 wt % and acetylene alcohol expressed by general formula (VII):

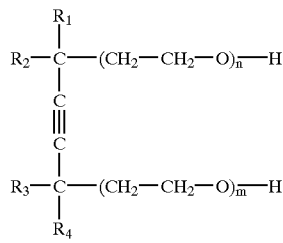

by 1 wt % is preferably used as the solvent of each probe solution. (In the above formula (IV), each of $R_1$, $R_2$, $R_3$ and $R_4$ represents a straight chain or branched alkyl group having 1 to 4 carbon atoms, while each of m and n represents 0 or a positive integer and $m+n \leq 30$.) When an above defined probe solution is used, the contact angle of the division wall relative to the probe solution can be made to be greater than 90° in a probe fixing carrier manufactured according to the invention that comprises a division wall 12 made of a resin composition containing carbon black and is subjected to a dry etching treatment and a subsequent plasma treatment. With such a contact angle, the surface of the probe fixing carrier shows a sufficiently high degree of water repellency relative to the probe solution so that occurrence of a mixed solution and appearance of blank areas can be effectively prevented. The contact angle is preferably greater than 100°, more preferably greater than 115°, most preferably greater than 130°. The contact angle of each of the openings 13 relative to the corresponding probe solution is preferably less than 30°. With such a contact angle, it is possible to achieve a sufficient improvement for the liquid spreading effect as a result of the water treatment. More preferably, the contact angle is less than 20°.

Step (g): Application and Fixation of Probe Solutions onto the carrier

Probe solutions are applied to the carrier and fixed there in a manner as described below. After regulating (aligning) the position of the liquid ejection head 24 relative to the carrier, probe solutions 25 are applied to the respective wells 13 in the division wall 12 by means of an ink-jet type apparatus (see FIGS. 2G and 2H). Now, an embodiment that is suitable for application and fixation of probe solutions onto the carrier will be described below in detail.

(Application Alignment)

With application alignment, the indexes prepared in the above described manner are shot by an imaging means such as a CCD camera adapted to use a laser as light source and the obtained image is processed and recognized by an image processing device to detect the positional coordinates of the indexes. Then, the XYθ stage of the liquid ejection device is positionally regulated on the basis of the detected coordinates and the head and the carrier are aligned. If it is desirable to reduce the dimensions of the indexes particularly in terms of the line width thereof, a CCD camera comprising an area sensor having a large number of pixels and/or provided with a plurality of area sensors may preferably be used for the purpose of the alignment.

(Liquid Ejection Device)

A probe carrier manufacturing apparatus to be used with a method of manufacturing a probe carrier according to the invention comprises a liquid ejection means for ejecting probe solutions by way of an ink-jet system and is adapted to apply solutions containing respective probes to specific respective positions on the probe fixing carrier having indexes in a probe non-fixing region thereof by referring to the positions of the indexes.

More specifically, while a probe carrier manufacturing apparatus to be used with a method of manufacturing a probe carrier according to the invention is provided with a liquid ejection means for ejecting probe solutions by way of an ink-jet system, the liquid ejection mechanism of the apparatus by turn comprises at least as many liquid ejecting sections as the number of probe solutions of a plurality of species. Each of the liquid ejecting sections has a liquid containing section for containing a probe solution, an ejection port provided for the liquid containing section, a liquid path for making the liquid containing section communicate to the corresponding ejection port and an energy generating means arranged at the ejection port so as to make it possible for the latter to eject the probe solution independently from the remaining probe solutions. The liquid ejection mechanism further comprises a means for detecting the positions of the indexes. The liquid ejection mechanism is preferably so designed that, after aligning the head and the carrier at desired respective positions by referring to the indexes, the probe solutions of a plurality of species are ejected independently from the liquid ejection means onto the carrier, while moving the liquid ejection means relative to the carrier that has recesses corresponding to the respective probe receiving positions, on the basis of the information on the positional arrangement of the probes. On the other hand, the arrangement for detecting the positions of the indexes is formed by an imaging means such as a CCD camera for obtaining an image of the surface of the probe array carrier, an image processing means and an XYθ stage for regulating the relative positions of the liquid ejection means and the probe carrier.

FIG. 9 is a schematic block diagram of the controller of a probe carrier manufacturing apparatus 101 that can be used for the purpose of the present invention. Referring to FIG. 9, there are shown an interface 95 for exchanging data with teaching pendant 92, a CPU 96 for controlling the probe carrier manufacturing apparatus 101 and processing the obtained image, a ROM 97 storing control programs necessary for operating the CPU 96, a RAM 98 for storing information on abnormal conditions, an ejection control section 99 for controlling the ejection of probe solutions, a stage control section 100 for control the operation of the XY stage (not shown) of the probe carrier manufacturing apparatus 101 and the probe carrier manufacturing apparatus 101 that is connected to the controller 91 and operate according to the instructions given by the controller 91.

(Probe Solution Ejection Head)

The liquid ejection head that is used for a method of manufacturing a probe carrier according to the invention is adapted to eject probe solutions by utilizing thermal energy. Therefore, preferably it is provided with a thermal energy generator for generating thermal energy to be applied to probe solutions. The ink-jet system that can be used for manufacturing a probe carrier may be a thermal jet system (bubble jet system), with which liquid is ejected by way of generating a bubble, utilizing thermal energy generated from electro-thermal converters such as heaters or lasers, or a piezo jet system adapted to eject liquid by way of the deformation of a piezo-element produced by applying a voltage to the element. Either system may be used for the purpose of the present invention. Of the two systems, the head to be used with the thermal jet system has a structure relatively simple if compared with the head to be used with the piezo jet system and hence can suitably be downsized and provided with a multi-nozzle. Additionally, the time required for probe solutions to be bonded to the carrier is relatively short so that production of a secondary structure of DNA can be avoided by the heat involved in the thermal jet system and the efficiency of the subsequent hybridization can be improved. For these reasons, the thermal jet system is advantageously used as the ink-jet system for the purpose of the present invention.

Typically, it is advantageous for the purpose of the invention to utilize the basic principles in the field of ink recording that are disclosed in U.S. Pat. Nos. 4,723,129 and 4,740,796. The disclosed principles may be applied to both the so-called on-demand type and the continuous type. However, the use of the on-demand type may be advantageous for the purpose of the invention because thermal energy can be generated in the electro-thermal converters that are arranged in correspondence to the liquid (ink)-holding sheets or the liquid paths by applying at least a drive signal for causing a rapid temperature rise to a level exceeding nucleus boiling in correspondence to recording information in order to give rise to film boiling to the thermal action plane of the recording head (liquid ejection head) and consequently a bubble can be formed in the liquid (ink) to show one-to-one correspondence relative to the drive signal. Liquid (ink) is ejected by way of an ejection port as a result of growth and contraction of the bubble to produce at least a droplet. If the drive signal is pulse-shaped, the bubble can be made to grow and contract immediately and appropriately so that liquid (ink) can be ejected in a highly responsive manner to a great advantage of effective ejection of liquid (ink). A pulse-shaped drive signal as described in U.S. Pat. Nos. 4,463,359 and 4,345,262 may suitably be used for the purpose of the invention. The information recording effect may be further improved when the conditions for the temperature rising rate of the thermal action plane as described in U.S. Pat. No. 4,313,124 are met.

As for the configuration of the ejection head, those realized on the basis of U.S. Pat. Nos. 4,558,333 and 4,459,600 that disclose a thermal action section arranged in a curved region in addition to the use of a combination of an ejection port, a liquid path and an electro-thermal converter (a straight liquid flow path or a rectangular liquid flow path) are within the scope of the present invention. Additionally, the advantages of the present invention can be effectively exploited if the use of a common slit for the ejection sections of a plurality of electro-thermal converters as disclosed in Japanese Patent Application Laid-open No. 59-123670 and the arrangement of an open hole for absorbing pressure waves of thermal energy in correspondence to the ejection sections as disclosed in Japanese Patent Application Laid-open No. 59-138461 are applied to the present invention. In short, regardless of the configuration of the liquid ejection head, spotting of probes can be accurately and efficiently realized according to the invention.

Furthermore, a full-line type liquid ejection head having a length corresponding to the largest width of the carrier that can be spotted by a liquid ejection device can also advantageously be applied to the present invention. Such a liquid ejection head may be so configured as to adapt itself to the necessary length either by combining a plurality of heads or by using an integral unitary head.

Furthermore, a serial type liquid ejection head rigidly secured to the apparatus main body, a replaceable tip type liquid ejection head that is electrically connected to the apparatus main body as it is fitted to the latter and adapted to apply probe solutions from the apparatus main body or a cartridge type liquid ejection head provided with an integral solution reservoir can also advantageously be applied to the present invention.

Preferably, a liquid ejection apparatus comprising a liquid ejection head that is provided with an ejection restoring means and/or a spare auxiliary means is used for the purpose of the invention because such an apparatus can enhance the advantages of the invention. Specific examples of such means include a cleaning means to be used for the liquid ejection head, a pressurizing or suction means, a spare heating means that may be an electro-thermal converter or a heating element of a different type or a combination thereof and a spare ejection means that is adapted to eject liquid in a form other than spotting.

Of the above listed devices, a device adapted to a film boiling system is most advantageous for the above described solutions.

(Probe Solution)

Now, the compositions of probe solutions that are used when preparing a probe carrier from a probe fixing carrier according to the invention and the method of ejecting such probe solutions will be described in detail below.

According to the invention, the probes that are fixed to a probe fixing carrier can be specifically bonded to a specific target substance. Additionally, the probes may contain oligonucleotides, polynucleotides and/or other polymers that can be recognized by a specific target. The term of "probe" as used herein refers to individual molecules that can operate as probe such as polynucleotide molecules or a group of molecules such as polynucleotide molecules that are fixed as distributed on a surface to show a same and identical arrangement and includes molecules called ligands. The probe and the target can often be exchangeable and also can be bonded or made to become bonded to each other as part of ligand-antiligant (which may also be referred to as receptor) pairs. For the purpose of the invention, a probe and a target can contain one or more than one natural bases and/or analogs.

Examples of probe that is supported on a carrier include a substance having a bonding section that is to be bonded to the carrier in a part of the oligonucleotide thereof showing a base arrangement that can be hybridized with a target nucleic acid, said bonding section to be bonded to the carrier being linked to the oligonucleotide by way of a linker. There are no limitations to the position of the bonding section to be bonded to the carrier in the oligonucleotide molecule so long as the desired reaction of hybridization is not adversely affected.

While the probes carried by a probe carrier manufactured by a method according to the invention may be appropriately selected depending on the application thereof, it is preferable that one or more than one types of probes are selected from DNAs, RNAs, cDNAs (complementary DNAs), PNAs, oligonucleotides, polynucleotides and other nucleic acids, oligopeptides, polypeptides, proteins, enzymes, substrates relative to enzymes, antibodies, epitopes relative to antibodies, antigens, hormones, hormone receptors, ligands, ligand receptors, oligosaccharides and polysaccharides for the purpose of advantageously embodying the method of the present invention.

For the purpose of the invention, a probe carrier refers to an object realized by fixing a plurality of probe species in independent respective regions of the surface of the carrier (including the surface of the inner walls of hollow members or tubular carrier members) typically as dot-shaped spots, while a probe array referes to a probe carrier in which probes are arranged orderly at a predetermined interval.

On the other hand, each probe has a structure that makes it possible to be bonded to the surface of the carrier and preferably be bonded onto the carrier by way of the structure that makes it possible to be bonded to the surface thereof. Preferably, the structure of each probe that makes it possible to be bonded to the surface of the carrier is formed by means of a process of introducing an organic functional group such as a amino group, a mercapto group, a carboxyl group, a hydroxyl group, an acid halide (haloformyl group; —COX), a halide (—X), aziridine, a maleimide group, a succinimide group, isothiocyanate, a sulfonylchloride (—$SO_2Cl$) group, an aldehyde group (formyl group, —CHO), hydrazine or acetamide iodide. Whenever necessary, the surface of the carrier may be treated appropriately in a manner that depends on the structure necessary for bonding the probes to the carrier.

When applying probe solutions containing probes onto a carrier by means of an ink-jet system, it is preferable that the liquid compositions are prepared in such a way that the applied droplets of the solutions do not spread unnecessarily on the carrier but remain within a predetermined area. Additionally, the liquid compositions are such that they do not adversely affect the proper performance of the probes nor the property of reacting with the respective functional groups on the surface of the carrier onto which the probes are introduced.

When an ink-jet system is used, it is preferable that the carrier is stored in a reaction vessel such as a wet vessel during the reaction in order to prevent the applied droplets from evaporating and drying because the droplets applied to the carrier surface are very small. Alternatively, the liquid ejected from the liquid ejection head may be made to contain a humidstatic agent. Particularly, in the case of a thermal jet system, the operation of ejecting liquid is accompanied by a temperature rise and hence the use of a humidstatic ingredient and a surface tension regulating ingredient is important. A solvent containing urea by 5 to 10 wt %, glycerol by 5 to 10 wt %, thiodiglycol by 5 to 10 wt % and acetylene alcohol by 1 wt % is preferably used for the purpose of applying marker substances or probes to the surface of the carrier.

Considering the ink-jet performance of the ejected liquid and the stability of the probe in the liquid and at the time of thermal jet (bubble jet) ejection, it is preferable that each probe solution typically contains a nucleic acid probe of 2 mer to 5,000 mer, particularly 2 mer to 60 mer to a concentration of 0.05 to 500 $\mu$M, particularly 2 to 50 $\mu$M.

As for the physical properties of each probe solution as liquid, it preferably shows a viscosity between 1 and 15 cps and a surface tension of not less than 30 dyn/cm from the viewpoint of its performance when ejected from a thermal jet head (bubble jet head). The probe solution will accurately and advantageously hit the target position on the carrier when the viscosity is between 1 and 5 cps and the surface tension is between 30 and 50 dyn/cm.

However, the viscosity and the surface tension of the liquid and the base length and the concentration of the nucleic acid probe may be out of the above defined respective ranges when a well-like structure is used so that the liquid applied onto the carrier by means of a liquid ejection head is prevented from spreading on the carrier and become mixed with the liquid of an adjacent spot.

(Ejection Mode)

The amount of probe solution that is ejected from a single nozzle at a time is selected as a function of the surface density of the probe spot on the probe carrier to which the probe solution is ejected. More specifically, the amount is selected as a function of the size and the shape of the dots of the probe array, taking the viscosity of the probe solution, the affinity between the probe solution and the carrier, the reactivity of the probe and the carrier and other elements into consideration. The amount of probe solution that is ejected from a single nozzle at a time is between 0.1 and 100 pl (picoliter), preferably between 0.1 and 50 pl. While the amount that is ejected at a time is preferably minimized from the viewpoint of raising the density of probes on the carrier, the probe solution will be prevented from getting to the carrier by the resistance of air if the amount that is ejected at a time is too small. The amount that is ejected at a time is preferably between 0.1 and 10 pl more preferably between 0.1 and 5 pl. Therefore, the nozzle diameter and other factors need to be designed by considering the amount.

Each spot of nucleic acid probe preferably shows a diameter between 20 and 100 $\mu$m and the spots are preferably made to be independent from each other for the purpose of confining the density of nucleic acid probes within the above range (and arranging more than 10,000 spots per inch with an upper limit of about $1 \times 10^6$ spots). The spots are defined as a function of the characteristics of the liquid ejected from each bubble jet head and those of the surface of the carrier to which the liquid is made to adhere.

According to the invention, a solution of a target substance that can be specifically bonded to a probe is supplied to the probe carrier and put them under appropriate reaction conditions to encourage them to be bonded to each other. When solutions of different target substances needs to be supplied to respective individual spots, at least a solution containing at least a target substance that is in a dissolved state and needs to be bonded to a probe is supplied to each of the plurality of spots on the probe carrier.

The target substance may also be applied onto the probe carrier by means of a liquid ejection device. Such an arrangement is preferable because a very small amount of liquid can be supplied quantitatively and the indexes of the probe carrier can also be used for regulating the alignment of the substrate and the ejection head.

Now, a method of detecting the position of a target substance that is specifically bonded to a probe fixed onto a probe carrier according to the invention that is prepared in a manner as described above will be described below.

For detecting the position of a target substance, it is preferable to detect fluorescent light emitted from the fluorescent labels that are related to the target substance specifically bonded to a probe particularly when the carrier has a division wall and openings (wells).

For the purpose of alignment of a scanned image in a detecting operation, it is possible to identify a probe emitting fluorescent light out of the probes formed on the carrier by taking an image of the probes on the probe carrier by means of an imaging means such as a CCD camera, using a laser as light source, processing the obtained image by means of an image processing device, recognizing the image and detecting the coordinates of the positions of the fluorescent labels by referring to the coordinates of the positions of the indexes. If the indexes are very small particularly in terms of the line width thereof, a CCD camera comprising an area sensor having a large number of pixels and/or provided with a plurality of area sensors may preferably be used for the purpose of the alignment.

The number of steps necessary for a surface treatment including a step of albumin treatment can be reduced for the purpose of simplification by using a method that does not detect information on the unnecessary substances remaining on the black matrix when detecting a probe emitting fluorescent light. For instance, a method of irradiating a laser beam from the rear surface of the carrier to detect fluorescent light emitted from a fluorescent substance or a method of detecting fluorescent light emitted from a fluorescent substrate from the rear surface of the carrier may be used.

EXAMPLE 1

Black resist containing carbon black ("CK-A143B": tradename, available from FUJIFILM Arch Co., Ltd.) was applied onto a glass substrate ("1737": tradename, available from Corning), exposed to light by means of a UV aligner in a predetermined manner, developed by means of an aqueous solution of inorganic alkali and subjected to a post bake treatment in which it was heated in a clean oven at 220° C. for 60 minutes to prepare a black matrix pattern (division wall) having a film thickness of 2 μm and rectangular openings of 100 μm×200 μm. Along with the black matrix pattern, two cross-shaped indexes having a transversal part that was 30 μm wide and 150 μm long and a vertical part that was also 30 μm wide and 150 μm long were formed at two corners of a peripheral part of the chip (see FIG. 1).

Subsequently, fluorescent coloring matter rhodamine B was dissolved into a solvent to be used for ejecting the coloring matter by a liquid ejection head that contains glycerol by 7.5 wt %, urea by 7.5 wt %, thiodiglycol by 7.5 wt % and acetylene alcohol expressed by general formula (VII) (e.g., Acetylenol EH: tradename, available from Kawaken Fine Chemicals)

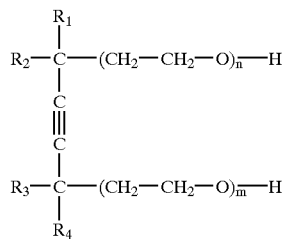

by 1 wt %, to a concentration of 10 μM. The coloring matter solution was injected into every other liquid reservoirs that were linked to the respective nozzles of an ink-jet head. Fluorescent coloring matter amino FITC (concentration 10 μM) that was turned into a solution was injected into the remaining reservoirs into which no rhodamine B solution had not been injected. Subsequently, an application alignment was conducted by referring to the cross-shaped indexes. In the operation of application alignment, the two cross-shaped indexes were shot by a CCD camera, using a laser as a light source, and the obtained image was processed and recognized by an image processing device to detect the coordinates of the indexes. Then, the head and the carrier were positionally aligned by regulating the XYθ stage of the liquid ejection device on the basis of the outcome of the coordinate detecting operation. The solutions of the two coloring matters were ejected from the respective nozzles of the liquid ejection head and applied onto a glass substrate that had been cleansed. Each of the reservoirs and the nozzles had been cleansed with said solvent and the corresponding coloring matter solution in advance and the residual liquid was suctioned by vacuum. This cleansing operation was repeated appropriately. A (main) droplet had a volume of 10 pl and occupied a circular area with a diameter of about 50 μm when the droplet (dot) was applied onto the carrier. The gap separating two adjacent dots on the carrier was about 100 μm.

An objective lens with a magnification of 20 (plan apochromatic objective lens) and fluorescent light filters (B-2A: for rhodamine B, B-2E/C: for amino FITC, tradenames, both are available from Nikon Corp.) were put to a Nikon fluorescent microscope ECLIPSE E800 (tradename, available from Nikon Corp.) and the applied coloring matter solutions were observed through the microscope with a magnification of 200 to find that the aqueous solutions had been applied properly without producing any color mixture. The dots were arranged in an orderly manner. No biased arrangement nor stains attributable to mist and/or other causes were observed.

EXAMPLE 2

Evaluation of Color Mixture By Hybridization

A glass substrate was cleansed as in Example 1. Subsequently, an aqueous solution containing an aminosilane coupling agent (KBM-603: tradename, compound I, available from Shinetsu Chemical Co., Ltd.) expressed by chemical formula (I) of

that had been refined by distillation under reduced pressure to a concentration of 1% was stirred at room temperature for an hour to hydrolyze the part of the methoxy group. Then, the substrate was dipped into the aqueous solution of the silane coupling agent immediately after the cleansing at room temperature for an hour. Subsequently, the substrate was washed with flowing water (ultrapure water) and dried by blowing nitrogen gas. Then, it was heated to fix the coupling agent at 120° C. in an oven.

After cooling the substrate, it was immersed into a 0.3% solution (ethanol: dimethylsulfoxide=1:1) of N-(6-maleimidecaproxy)succinimide (EMCS: compound II)

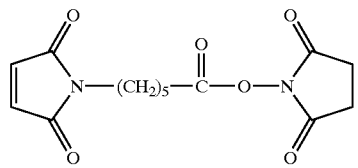

for two hours to cause EMCS to react with the amino group of the aminosilane coupling agent. After the reaction, the substrate was washed with ethanol : dimethylsulfoxide=1:1 once and with ethanol three times and dried by blowing nitrogen gas.

5'-ATGAACCGGAGGCCCATC-3' SEQ1
3'-TACTTGGCCTCCGGGTAG-5' SEQ2
5'-AAAAAAAAAAAAAAAAAAAAAAAA-3' SEQ3
3'-TTTTTTTTTTTTTTTTTTTTTTTT-5' SEQ4

Oligonucleotides (compounds III and IV: BEX Co. Ltd.) respectively having the base sequences of SEQ2 and SEQ4 that are complementary to the base sequences of SEQ1 and SEQ3 and also at the 5' end a mercapto group (SH group : also referred to as sulfidryl group) that can ultimately react with and become bonded to a refined maleimide group on the surface of the substrate by way of a linker were utilized for oligonucleotide probes.

As in Example 1, each of the compounds III and IV was dissolved into a solvent to be used for ejection until the solutions showed a light absorbance of 1.0. Then, the obtained solutions were applied from a liquid ejection head onto the glass substrate to form spots that were arranged alternately as in Example 1. Each of the reservoirs and the nozzles had been cleansed with said solvent and the corresponding oligonucleotide solution in advance and the residual liquid was suctioned by vacuum repeatedly. The volume of each liquid droplet, the dot size, the gap separating two adjacent dots, the ejection pattern, the number of times of ejection, the charging by means of an ionizer and the charging of a mist adsorbing section were same as those of Example 1. The solvent of this example has a high humidstatic effect and hence can prevent the inside of the reservoirs and the oligonucleotide solutions on the substrate from drying.

The substrate onto which the solutions of the compounds III and IV had been ejected was then put to react in a humidstat chamber showing a humidity of 100% at room temperature for an hour and cleansed in flowing water (ultrapure water) for about 30 seconds. Subsequently, the substrate was immersed in a 50 mM phosphate buffer solution (pH=7.0, containing 1 M NaCl) containing BSA (bovine serum albumin, available from Sigma Aldrich Japan) to a concentration of 2% for an hour. Then, the substrate was appropriately washed with the buffer solution and stored in the latter.

(Hybridization)

As model target DNAs, compounds V and VI (purchased from BEX Co. Ltd.) having respectively the sequences of SEQ1 and SEQ3 of this example, to the 5' end of which tetramethylrhodamine was bonded, were used for hybridization.

As model target DNAs, compounds (V, VI):(only V is shown, the DNA part of VI is A25) having respectively DNA molecules and the sequences of above SEQ1 and SEQ3, to the 5' end of which tetramethylrhodamine as fluorescent label was bonded, purpose of removing the unreacted target DNAs. After the cleansing operation, the substrates covered by the buffer solution were put on a slide glass and covered by a cover glass. Then, fluorescent light from the fluorescent labels were observed by irradiating the substrates with a laser beam from the back surface. The microscope used for the observation was a fluorescent microscope ECLIPSE E800 (tradename, available from Nikon Corp) provided with an objective lens with a magnification of 20 (plan apochromat) and a fluorescent light filter (Y-2E/C). Fluorescent light was observed only from the parts of each of the substrates where probes complementary to the target DNA existed. The dots of the probes were found to be arranged in an orderly manner.

EXAMPLE 3

[Formation of Black Matrix]

Black resist (CK-A143B Resist: tradename, available from FUJIFILM Arch Co., Ltd.) containing carbon black was applied onto a glass substrate (1737: tradename, available from Corning) and subjected to a predetermined exposure session using a UV aligner and a developing operation using an inorganic aqueous alkali solution. Then, the substrate was heated in a clean oven at 220° C. for 60 minutes and subjected to a post bake treatment to prepare a black matrix pattern (division wall) having a film thickness of 2 µm and rectangular openings of 100 µm×200 µm. The length a of the division wall was made equal to 20 µm.

[Evaluation of Surface Coarseness]

The surface coarseness of the glass substrate used for forming the black matrix was observed at arbitrarily selected areas by using NanoScope IIIa AFM Dimension 3000 Stage System (tradename, available from Digital Instrument) before forming the black matrix. As a result, the substrate showed an average surface coarseness (Ra) of 3 nm.

Dry Etching Treatment

The glass substrate on which a black matrix had been formed (black matrix substrate) was subjected to a plasma

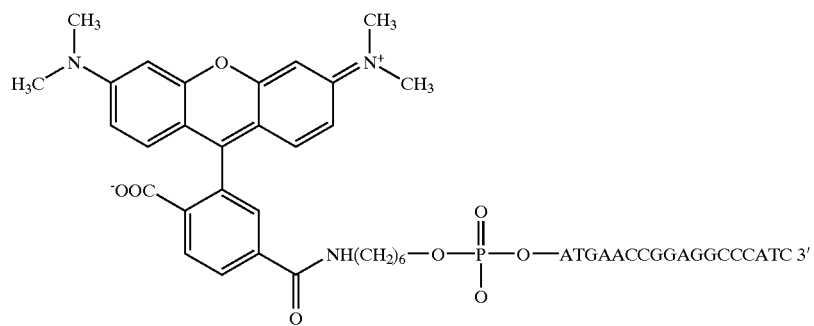

(V)

were used and subjected to respective hybridization reactions with the prepared probes on the substrate.

The hybridization reactions were conducted in separate hybri-packs, using respectively two substrates and 2 ml of phosphate buffer solutions (10 mM phosphate buffer solutions, pH=7.0, containing 50 mM NaCl) containing the compounds V and VI to a concentration of 5 nM. The two substrates were put into the respective hybri-packs with the model target DNA solutions and the hybri-packs were hermetically sealed. They were then heated to 70° C. in a humidstat tank and subsequently cooled to 50° C. Thereafter, they were left in that condition for 10 hours.

Then, the substrates were taken out from the hybri-packs and cleansed with a buffer solution for hybridization for the treatment under the following conditions, using a parallel plates type plasma treatment apparatus that employs the cathode coupling system.

| | |
|---|---|
| gas | $O_2$ |
| gas flow rate | 80 sccm |
| pressure | 8 Pa |
| RF power | 0.15 KW |
| treatment time | 30 sec |

[Plasma Treatment]

After the completion of the dry etching treatment, the black matrix substrate was subjected to a plasma treatment under the following conditions, using the same apparatus.

| gas | $CF_4$ |
|---|---|
| gas flow rate | 330 sccm |
| pressure | 44 Pa |
| RF power | 1.2 KW |
| treatment time | 130 sec |

[Water Treatment]

The black matrix substrate that had been subjected to a plasma treatment was then subjected to a water treatment. More specifically, the black matrix substrate was immersed into a ultrasonic wave pure water tank under the following conditions.

| pure water temperature | 50 to 60° C. |
|---|---|
| ultrasonic wave frequency | 40 kHz |
| treatment time | 5 min |
| drying | lifting and drying, 60° C., 5 min |

[Evaluation of Water Repellency]

The black matrix substrate that had been subjected down to the water treatment was observed for the contact angle relative to pure water by means of an automatic liquid crystal glass cleaning/treatment inspection apparatus "LCD-400S" (tradename, available from KYOWA INTERFACE SCIENCE CO., Ltd.). The surface of the black matrix was observed on a frame having a width of 5 mm and arranged around the micro pattern, whereas the surface of the glass substrate was observed in an area outside of the frame where no black matrix pattern was formed. The contact angles of the surfaces were as follows.

| glass substrate surface | 12° |
|---|---|
| black matrix surface | 125° |

[Supply of Aqueous Solution to Carrier by Means of Ink-Jet System]

Subsequently, fluorescent coloring matter rhodamine B was dissolved in an aqueous solution containing the solvent to be ejected from a liquid ejection head that contained glycerol by 7.5 wt %, urea by 7.5 wt %, thiodiglycol by 7.5 wt % and acetylene alcohol expressed by general formula (VII) (e.g., Acetylenol EH: tradename, available from Kawaken Fine Chemicals)

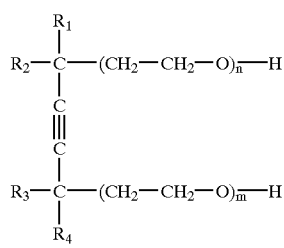

by 1 wt % to a concentration of 10 μM. Subsequently, the rhodamine B aqueous solution was supplied to each opening by 20 pl by means of an ink-jet apparatus. Subsequently, a 10 μM aqueous solution of amino FITC was supplied by 20 pl to another first region by means of another ink-jet head. The use of rhodamine B and amino FITC was selected because they dissolve in water and are advantageous for observing the state of the supplied liquid and that of cross contamination by means of fluorescent light.

The contact angle of the above black matrix substrate relative to the probe solution was observed by means of an automatic liquid crystal glass cleaning/treatment inspection apparatus "LCD-400S" (tradename, available from KYOWA INTERFACE SCIENCE CO., Ltd.). The surface of the black matrix was observed on a frame having a width of 5 mm and arranged around the micro pattern, whereas the surface of the glass substrate was observed in an area outside of the frame where no black matrix pattern was formed. The contact angles of the surfaces were as follows.

| glass substrate surface | 17° |
|---|---|
| black matrix surface | 115° |

A G excitation filter (for rhodamine B) and a B excitation filter (for amino FITC) were fitted to a Nikon fluorescent microscope and each of the supplied aqueous solutions was observed for its state by using fluorescent light. It was found that each aqueous solution had been supplied uniformly in the first region without forming any liquid droplet. It was also found that no fluorescent light of any foreign coloring matter was observed in the first region where the proper coloring matter was to be supplied. Therefore, it was found that an aqueous solution can be supplied to each first region without cross contamination. When the diameter of the applied liquid droplet was observed, it was found that the solution had satisfactorily wetted the substrate and spread in the opening so that the edges of the liquid droplet could not be detected. No blank area was observed in all the specimens of probe carrier prepared in this example.

COMPARATIVE EXAMPLES 1 and 2

A probe carrier was prepared as in Example 3 except that the plasma treatment and the water treatment were not conducted. The contact angles of the black matrix substrate relative to pure water were as follows.

| glass substrate surface | 80° |
|---|---|
| black matrix surface | 80° |

A probe carrier was prepared as in Example 1 except that no water treatment was conducted. The contact angles of the black matrix substrate relative to pure water were as follows.

| glass substrate surface | 15° |
|---|---|
| black matrix surface | 130° |

The spreading property of the solution was also observed to find that the probe solution of an amount of 20 pl had not wetted the substrate nor spread in the opening and a blank area was observed in all the openings.

EXAMPLE 4

A probe carrier was prepared in a manner as described above by referring to Example 1 and a dry etching treatment, a plasma treat and a water treatment were also conducted as pretreatment for applying probe solutions onto the carrier as in Example 3.

An objective lens with a magnification of 20 (plan apochromatic objective lens) and fluorescent light filters (B-2A: for rhodamine B, B-2E/C: for amino FITC, tradenames, both are available from Nikon Corp.) were put to a Nikon fluorescent microscope ECLIPSE E800 (tradename, available from Nikon Corp) and the applied coloring matter solutions were observed through the microscope with a magnification of 200 to find that the aqueous solutions had been applied properly without producing any color mixture. The dots were arranged in an orderly manner. No biased arrangement nor stains attributable to mist and/or other causes were observed. Furthermore, it was found that the solution had satisfactorily wetted the substrate and spread in the opening so that the edges of the liquid droplet could not be detected. No blank area was observed in all the specimens of probe carrier prepared in this example.

In this example, the probe carrier was provided with indexes and subjected to a plasma treatment and a de-fluorine treatment. In other words, a carrier having a division wall that was highly repellent relative to aqueous probe solutions and probe fixing regions that were highly hydrophilic was prepared. Then, the probe solutions of adjacent openings (well) of the division wall were never mixed with each other and the intended probe solutions could be applied to the intended respective positions if some of the probe solutions were displaced slightly from the respective proper positions where they were to be applied when an operation of application alignment was conducted by referring to the indexes.

Thus, according to the invention, it is possible to accurately, quickly and reliably manufacture a probe carrier that densely carries probes by using a carrier having indexes in a probe non-fixing region, applying solutions containing probes to specific positions on the carrier by referring to the indexes and fixing the probe. Additionally, according to the invention, it is possible to accurately and quickly detect the position of the target substance that is specifically bonded to a probe fixed onto the probe carrier manufactured by a method according to the invention by referring to the indexes.

What is claimed is:

1. A probe carrier carrying probes of a plurality of species fixed at respective specific different positions on the carrier and adapted to be specifically bonded to a target substance, said carrier having a division wall for partitioning said specific positions, wherein if the average value of the length of the cross section of the division wall parallel to the substrate and representing the part of the division wall located at the height of 80 to 100% of the height of the top of the division wall as measured from the bottom to the top of the cross section of the division wall is a and the length of the bottom of the cross section of the division wall is b, the division wall has a profile where the relationship of a and b satisfies the requirement of formula $$1.3 \geq a/b \geq 0.7.$$

2. A probe fixing carrier for carrying probes of a plurality of species fixed at respective specific different positions on the carrier and adapted to be specifically bonded to a target substance, said carrier having a division wall for partitioning said specific positions, wherein if the average value of the length of the cross section of the division wall parallel to the substrate and representing the part of the division wall located at the height of 80 to 100% of the height of the top of the division wall as measured from the bottom to the top of the cross section of the division wall is a and the length of the bottom of the cross section of the division wall is b, the division wall has a profile where the relationship of a and b satisfies the requirement of formula $$1.3 \geq a/b \geq 0.7.$$

* * * * *